United States Patent
Herrmann et al.

(10) Patent No.: US 7,776,278 B2
(45) Date of Patent: Aug. 17, 2010

(54) APPARATUS AND PROCESS FOR THE GAS-PHASE POLYMERIZATION OF OLEFINS

(75) Inventors: Eberhard Herrmann, Frankental (DE); Manfred Hecker, Neustadt Wied (DE); Rainer Karer, Kaiserlautern (DE); Klaus Berhalter, Bornheim Dersdorf (DE); Paulus De Lange, Wesseling (DE); Jörg Halpap, Bockelwitz (DE); Cyrus Ahmadzade-Youssefi, Köln (DE)

(73) Assignee: Basell Polyolefine GmbH, Wesseling (DE)

( * ) Notice: Subject to any disclaimer, the term of this patent is extended or adjusted under 35 U.S.C. 154(b) by 574 days.

(21) Appl. No.: 11/667,417

(22) PCT Filed: Nov. 8, 2005

(86) PCT No.: PCT/EP2005/011935
§ 371 (c)(1),
(2), (4) Date: May 8, 2007

(87) PCT Pub. No.: WO2006/050907
PCT Pub. Date: May 18, 2006

(65) Prior Publication Data
US 2008/0014128 A1  Jan. 17, 2008

Related U.S. Application Data

(60) Provisional application No. 60/631,082, filed on Nov. 23, 2004.

(30) Foreign Application Priority Data
Nov. 9, 2004 (DE) ............... 10 2004 054 304

(51) Int. Cl.
*B01J 19/00* (2006.01)
(52) U.S. Cl. .................. 422/131; 528/502 A
(58) Field of Classification Search .......... 526/67–70; 55/307, 341.6, 344, 350.1, 391, 413, 434; 528/502 A; 34/588; 422/131–138, 144
See application file for complete search history.

(56) References Cited

U.S. PATENT DOCUMENTS
3,687,920 A * 8/1972 Johnson ............ 422/131
(Continued)

FOREIGN PATENT DOCUMENTS
DE  3930765  2/1991
(Continued)

OTHER PUBLICATIONS

Ullman's *Encyclopedia of Industrial Chemistry*, "Dust Separation—Filters;" E. Schmidt, F. Löffler; 6th Edition (2000).
Kunii et al., "Cyclones," *Fluidization Engineering*, Butterworth-Heinemann, p. 391-392 (1991).

*Primary Examiner*—Walter D Griffin
*Assistant Examiner*—Timothy Cleveland

(57) ABSTRACT

Apparatus for the polymerization of olefins, in particular ethylene, comprising a gas-phase fluidized-bed reactor (1), a product offtake line (15) for taking polymer particles either continuously or discontinuously from the reactor (1), which line (15) is connected to a depressurization vessel (2) for separating polymer particles and gas, a recycle gas filter (3) for freeing the gas of entrained fine particles connected to the depressurization vessel (2), a compressor which compresses the gas which has been freed of fine particles and recirculates it into the reactor (1), with the recycle gas filter (3) having an inlet chamber (4) provided with a gas inlet (6), an outlet chamber (5) provided with a gas outlet (7), an essentially vertical sheet-like filter medium (9) for retaining the fine particles which separates the inlet chamber (4) from the outlet chamber (5) and a particle outlet (8). The inlet chamber (4) has a dividing wall (10) which is arranged essentially parallel to the filter medium (9) and separates the inlet chamber (4) into an inflow region (4a), which is connected to the gas inlet (6), and a filter region (4b) in which the filter medium is located and has an upper opening and a lower opening which are dimensioned so that from 60 to 90% of the volume flow flows through the upper opening so that flow along the filter medium (9) from the top downward results.

15 Claims, 3 Drawing Sheets

U.S. PATENT DOCUMENTS

| | | | |
|---|---|---|---|
| 4,486,207 A | | 12/1984 | Baillie |
| 4,740,550 A | | 4/1988 | Foster |
| 4,764,190 A | * | 8/1988 | Israelson et al. ........... 55/341.1 |
| 5,521,264 A | * | 5/1996 | Mehra et al. .................. 526/68 |
| 5,771,844 A | | 6/1998 | Dietz |
| 6,174,969 B1 | | 1/2001 | Kersting et al. |
| 6,649,709 B1 | | 11/2003 | Bauer et al. |
| 6,849,699 B2 | | 2/2005 | Bauer et al. |
| 6,936,666 B2 | | 8/2005 | Mihan et al. |
| 2004/0236040 A1 | | 11/2004 | Mihan et al. |
| 2005/0126394 A1 | | 6/2005 | Reiling |

FOREIGN PATENT DOCUMENTS

| | | |
|---|---|---|
| EP | 089691 | 9/1983 |
| EP | 301872 | 2/1989 |
| EP | 475603 | 3/1992 |
| EP | 571826 | 12/1993 |
| EP | 972572 | 1/2000 |
| WO | 99/29736 | 6/1999 |
| WO | 03/080252 | 10/2003 |
| WO | 2006/050919 | 5/2006 |

* cited by examiner

APPARATUS AND PROCESS FOR THE GAS-PHASE POLYMERIZATION OF OLEFINS

This application is the U.S. national phase of International Application PCT/EP2005/011935, filed Nov. 8, 2005, claiming priority to German Patent Application 102004054304.6 filed Nov. 9, 2004, and the benefit under 35 U.S.C. 119(e) of U.S. Provisional Application No. 60/631,082, filed Nov. 23, 2004; the disclosures of International Application PCT/EP2005/011935, German Patent Application 102004054304.6 and U.S. Provisional Application No. 60/631,082, each as filed, are incorporated herein by reference.

The present invention relates to an apparatus for the polymerization of olefins, in particular ethylene, comprising a gas-phase fluidized-bed reactor, a product offtake line for taking polymer particles either continuously or discontinuously from the reactor, which line is connected to a depressurization vessel for separating polymer particles and gas, a recycle gas filter for freeing the gas of entrained fine particles connected to the depressurization vessel, a compressor which compresses the gas which has been freed of fine particles and recirculates it into the reactor, with the recycle gas filter having an inlet chamber provided with a gas inlet, an outlet chamber provided with a gas outlet, an essentially vertical sheet-like filter medium for retaining the fine particles which separates the inlet chamber from the outlet chamber and a particle outlet.

Gas-phase polymerization processes are economical processes for the polymerization of ethene and propene or for the copolymerization of ethene or propene with other $C_2$-$C_8$-$\alpha$-olefins. Such gas-phase polymerization processes can be configured, in particular, as gas-phase fluidized-bed processes in which the polymer particles are kept in suspension by means of a suitable gas stream. Processes of this type are described, for example, in EPA-0 475 603, EPA-0 089 691 and EPA-0 571 826, whose contents are hereby fully incorporated by reference.

In such a case, the polymer particles present in the fluidized bed are discharged continuously or discontinuously and conveyed pneumatically into a depressurization vessel. In addition to the polymer particles, considerable amounts of gas are also discharged from the reactor and it is sensible to recirculate this gas to the process. The gas which has been separated off from the polymer particles in the depressurization vessel and still contains considerable amounts of fine dust cannot be returned directly to the reactor circuit but instead firstly has to be substantially freed of the fine particles in order to avoid deposits in the compressor.

Recycled gas filters comprising batteries of bag filters are usually employed for this purpose, since such filters have a relatively long period of operation even at high dust loadings.

An ideal design of the recycle gas filter in terms of dust deposition and filter cleaning, in particular avoidance of the buildup of an unstable filter cake, is of considerable importance in order to ensure very high plant availability. Blockage of the filter would lead to a shutdown of the plant or the filters would have to have a multiple capacity to allow the filter to be changed during operation of the plant.

DE 39 30 765 C1, whose contents are hereby fully incorporated by reference, discloses a bag filter in which an upper wall section and a lower wall section are used in the inlet region of the filter to make transverse and longitudinal flow onto the filter possible and make the dust deposition over the filter area more uniform. The upper wall section and the lower wall section are mounted so as to allow them to be swiveled horizontally relative to one another so as to be able to influence the ratio of the flow from below to the flow from the side. The flow from the side is brought about by means of a fixed dividing wall for the gas. Such an arrangement is firstly quite complicated and secondly the stability of the filter cake leaves something to be desired.

It was an object of the present invention to overcome the abovementioned disadvantages of the prior art and to provide a process and an apparatus by means of which the recycle gas stream can be freed of particles and which gives a long operating time.

This object is achieved according to the invention by the inlet chamber having a dividing wall which is arranged essentially parallel to the filter medium and divides the inlet chamber into an inflow region which is connected to the gas inlet and a filter region in which the filter medium is located and has an upper opening and a lower opening which are dimensioned so that from 60 to 90% of the volume flow flows through the upper opening so that flow along the filter medium from the top downward results.

An important aspect of the solution provided according to the invention is that the proportion of the gas to be purified flowing onto the filter medium from above is significantly higher than the proportion flowing onto the filter medium from below. In this way, a high gas throughput (high volume flow) through the filter is achieved at a relatively low flow velocity along the filter. The formation of a filter cake which can readily be cleaned off is aided by the cleaning of the filter being achieved both by means of gravity and by means of the gas flowing onto the filter from the top downward. The arrangement according to the invention might prevent fine particles which have been cleaned off redepositing on the filter and forming a filter cake which can no longer be cleaned off completely (unstable filter cake), without being bound to this explanation. The filter is therefore particularly suitable for polymerization plants using a fluidized-bed reactor, since large amounts of fine dust are frequently formed here, without being restricted to this application. However, it may be emphasized that the filter of the invention is in principle suitable for all applications in which the formation of an unstable filter cake due to high proportions of fines is to be prevented.

Another important aspect is that the inlet chamber is divided into two regions, viz. an inflow region and a filter region. As a result of this division, the inflowing particle-containing gas does not impinge directly on the filter but is instead distributed over the filter area via the upper and lower openings in the dividing wall. Erosion of the filter material in long-term operation is avoided thereby. Furthermore, the risk of tearing the filter material is considerably reduced by appropriate dimensioning of the upper and lower openings, even in the case of pressure surges which occur in particular during discontinuous removal of the polymer product from the polymerization reactor.

As filters, it is possible to use all filter types which operate using sheet-like filter media. They can also be surface or deep-bed filters, with surface filters being preferred. Bag filters, preferably in the form of batteries of bag filters, are most frequently used. However, envelope filters or cartridge filters can also be used. All customary filter media are in principle suitable as filter media. The only restriction in terms of the material is in respect of its fire resistance so that the filter medium does not ignite when the filter is opened in the presence of metal alkyls. Preference is given to using nonwovens or woven fabrics, for example materials of this type made of glass, metal or preferably noncombustible plastics such as polyphenylene sulfide (PPS). Information on the selection and design of the filter media may be found, for example, in Ullmann's Encyclopedia of Industrial Chemistry, 6th Edition, 2000 Electronic Release, whose contents are hereby fully incorporated by reference.

The filter efficiency after a stable filter cake has been built up is usually above 99%, preferably above 99.9%.

To clean the filter, the flow can be reversed briefly at regular intervals, with such cleaning being carried out at short intervals by means of the arrangement according to the invention. According to the invention, such cleaning at regular intervals is preferred.

In a preferred embodiment of the present invention, the dividing wall is cylindrical and the filter medium is located in the interior of the cylinder. In such a case, bag filters arranged in parallel are preferred. The upper and lower openings of the dividing wall can in this way be configured as annular gaps which allow very uniform flow onto the filter.

In a further preferred embodiment of the present invention, the inlet chamber is cylindrical and the gas inlet is connected eccentrically, in particular essentially tangentially, to the inlet chamber. Preliminary deposition of the filter dust in the inflow region is achieved in this way.

According to the invention, preference is given to the inlet chamber and the dividing wall being cylindrical and the central axes being essentially vertical. The cylindrical dividing wall completely surrounds the filter material in such a case.

It is also preferred that from 60 to 85%, particularly preferably from 65 to 80%, of the volume flow flows through the upper opening, which results in a particularly advantageous combination of gas throughput and filter cleaning. The design of the upper and lower openings to distribute the volume flows can be calculated by engineering methods or determined by simple experiments. The throughput per unit area through the filter should usually not exceed 120 $m^3/m^2h$, with a throughput per unit area through the filter of from 20 to 100 $m^3/m^2h$ being preferred and a throughput per unit area through the filter of from 30 to 60 $m^3/m^2h$ being particularly preferred.

The present invention further provides a process for the polymerization of olefins, in which the olefin is polymerized in the presence of a catalyst in a gas-phase fluidized-bed reactor, the polymer particles are taken off continuously or discontinuously from the reactor, the polymer particles are separated from the gas carried out together with them and the gas is freed of entrained fine particles by means of a recycle gas filter, compressed and at least partly recirculated to the reactor, with the recycle gas filter having an essentially vertical sheet-like filter medium for retaining the fine particles, wherein from 60 to 90% of the volume flow flows onto the filter medium from above, so that a flow along the filter medium from the top downward results.

The invention is illustrated below with the aid of drawings, without the invention being restricted thereto.

BRIEF DESCRIPTION OF THE DRAWINGS

FIG. 1 shows the construction of a polymerization plant having a gas-phase fluidized-bed reactor.

Figure 1:
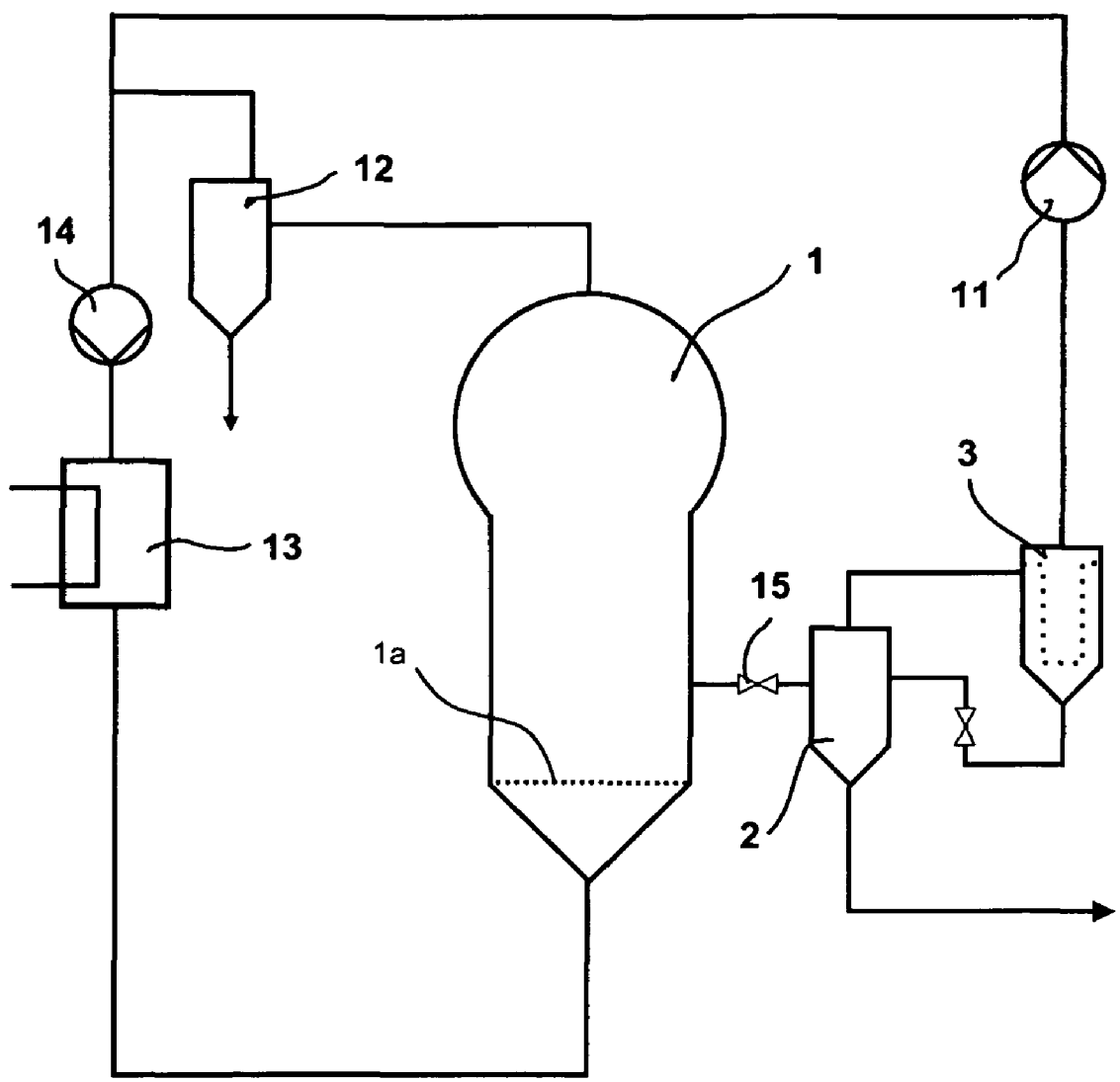
FIG. 1 shows a schematic diagram of a gas-phase fluidized-bed reactor.

A gas-phase fluidized bed usually consists of particles which are kept suspended in the gas phase by a stream of gas. According to the invention, the fluidized bed can comprise not only a gas or gas mixture but also condensed material as fluid.

The actual reactor 1 comprises a cylindrical tube. The fluidized bed 1b is usually bounded at the bottom by a gas distributor plate 1a. At the top of the cylindrical part, it is usually adjoined by a widening calming zone 1c which reduces the discharge of particles from the reactor 1. In an alternative embodiment, the calming zone can be omitted. The reaction gas leaves the reactor 1 at the upper end of the calming zone and is conveyed in the gas circulation line via a cyclone 12 to the compressor 14 and from there via a heat exchanger 13 in which the recycle gas is cooled back to the reactor 1.

When the plant is used for the polymerization of α-olefins, the circulated reactor gas is usually a mixture of ethene or propene, if desired a molecular weight regulator such as hydrogen and inert gases such as nitrogen and/or saturated hydrocarbons such as ethane, propane, butane, pentane or hexane. In addition, the reactor gas can further comprise $C_3$-$C_8$-α-olefins such as propene, 1-butene, 1-pentene, 2-methylpentene, 1-hexene, 1-heptene and 1-octene, which may also be present in condensed form, as comonomers. Preference is given to a process in which ethylene is copolymerized with 1-hexene or 1-butene. The velocity of the reactor gas has to be sufficient firstly to fluidize the mixed loose bed of finely divided polymer which is present in the tube and serves as polymerization zone and secondly to remove the heat of polymerization effectively.

To set constant reaction conditions, the constituents of the reactor gas can be fed directly into the gas-phase fluidized-bed reactor or into the circulated reactor gas.

The capacity of the gas-phase fluidized-bed reactor is, as is known, limited by the cooling capacity of the circulated reactor gas. This cooling capacity depends firstly on the pressure under which the reactor gas is maintained or at which the (co)polymerization is carried out. It is generally advisable to work at pressures of from 0.1 to 10 MPa, preferably from 1 to 8 MPa and in particular from 1.5 to 5 MPa. In addition, the cooling capacity depends on the temperature at which the (co)polymerization is carried out in the fluidized bed. In the process of the invention, it is advantageous to work at temperatures of from 30 to 125° C., particularly preferably from 75 to 118° C., with temperatures in the upper part of this range preferably being set for copolymers having a relatively high density and temperatures in the lower part of this range preferably being set for copolymers having a relatively low density. Furthermore, the amount of catalyst metered in determines the product output.

Apart from the temperature, the proportion of inert gases such as nitrogen or inert hydrocarbons has an influence on the risk of conglutinations and deposits occurring. High proportions of inert gas can reduce the risk of deposits, but can at the same time adversely affect the space-time yield as a result of low catalyst productivities, so that the process can become uneconomical. In the process of the invention, the proportion of inert gas is preferably from 15 to 75% by volume, particularly preferably from 35 to 50% by volume, based on the total volume of the reaction gas.

As catalysts, it is possible to use all known types of catalyst which are suitable for olefin polymerization. Particular mention may be made of Ziegler catalysts, chromium-based Phillips catalysts and single-site catalysts, in particular metallocene catalysts, without being restricted thereto.

The polymer is discharged continuously or discontinuously through one or more discharge lines 15. The polymer is freed of the major part of the gas discharged with it in a depressurization vessel 2 and is passed to the further processing units.

The gas which has been separated from the polymer and which contains considerable amounts of entrained fine dust is fed into the recycle gas filter 3 in which the gas is largely freed of the fine dust. The purified gas is compressed to the reactor pressure in a compressor 11 and fed into the circulating gas.

Figure 2:
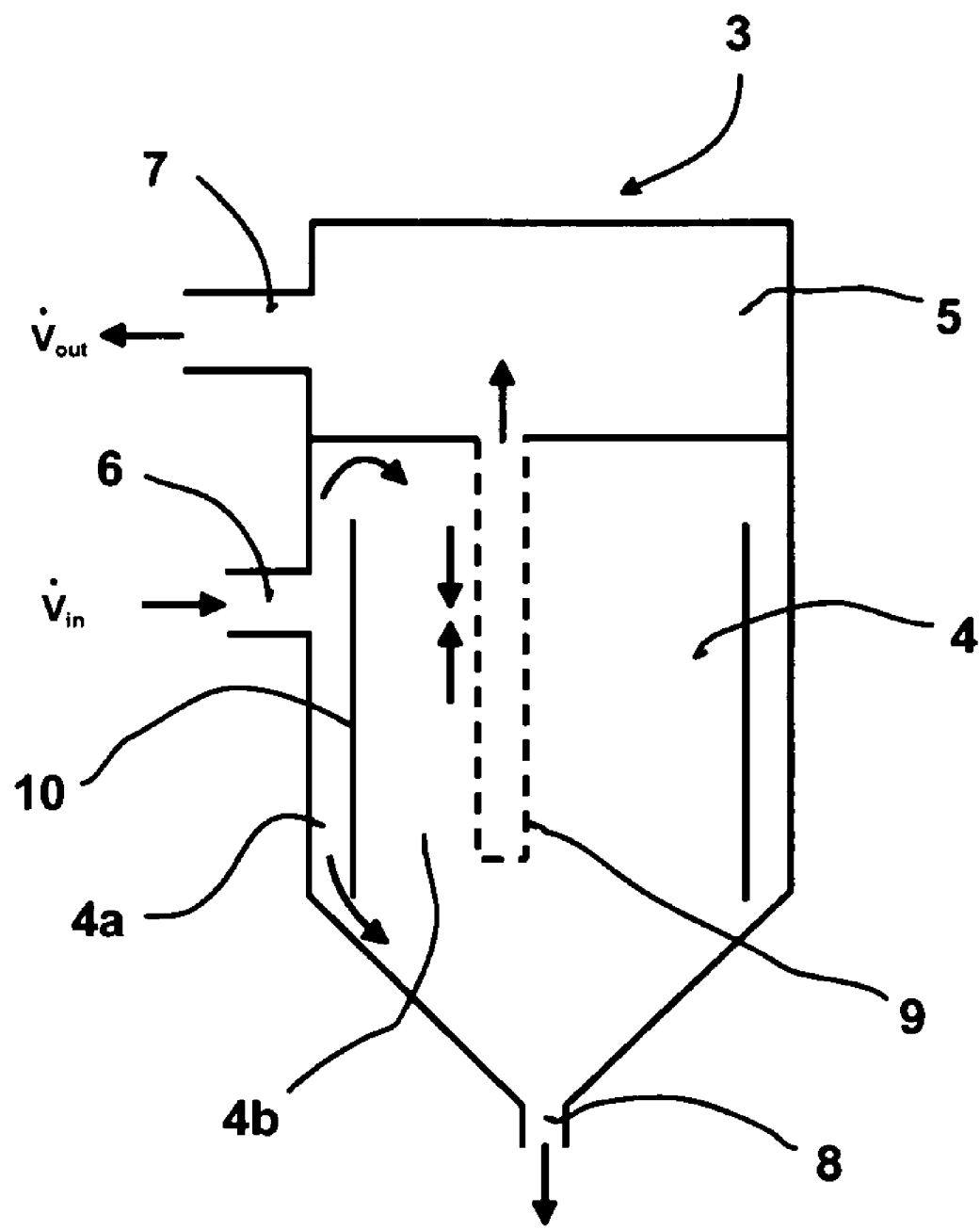
FIG. 2 shows a schematic diagram of a recycle gas filter according to the invention (vertical section)
Figure 3:
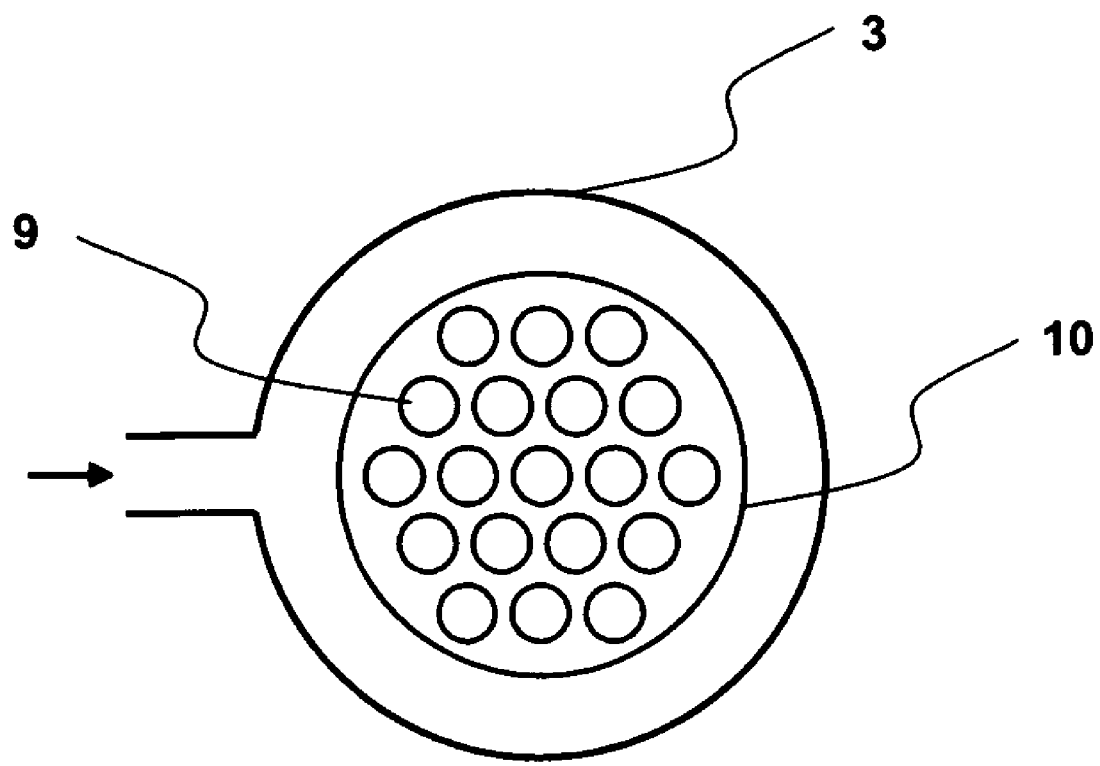
FIG. 3 shows a schematic diagram of a recycle gas filter according to the invention (horizontal section).

FIG. 2 schematically shows a vertical section through a recycle gas filter 3 according to the invention, and FIG. 3 shows a horizontal section through such a filter 3. The recycle gas filter is essentially cylindrical and contains an inlet or raw gas region 4 in its lower region and an outlet or clean gas region 5 in its upper region. Inlet region and outlet region are separated by the sheet-like filter medium 9. The filter medium is installed in the form of bag filter batteries 9 which extend vertically in the recycle gas filter 3.

The inlet gas region 4 extends downward in the shape of a truncated cone and finally ends in a particle outlet 8 via which the retained particles from the recycle gas filter 3 can be discharged. The fine dust is discontinuously returned to the depressurization vessel 2 and added to the polymer.

The inlet region 4 is divided by a dividing wall 10 into two regions, viz. an inflow region 4a and a filter region 4b. The dividing wall 10 likewise extends in the form of a cylinder into the inlet region 4, so that the inflow region 4a has a circular cross section. The dividing wall has an upper opening and a lower opening in the form of annular gaps, with the ratio of the gap widths of the upper gap and the lower gap being about 1.9, so that the proportion of the volume flow which flows through the upper annular gap is about 65%. The gaps are dimensioned so that the gas flowing through the gas inlet is distributed sufficiently over the bag filters without a significant pressure drop being produced. The gap velocity is preferably less than 1 m/s. It is possible, firstly, for the gaps to be fixed or else for the cylindrical dividing wall 10 to be mounted so that it can be moved vertically in order to alter the flow coming in from the top and from below during operation and thus adapt the operating conditions. The flow direction of the raw gas is indicated by arrows.

The bag filters 9 are conventional commercially available bag filters comprising noncombustible filter material, for example polyphenylene sulfide (PPS).

The filters are cleaned at regular intervals by reversal of the flow. The use of such cleaning is generally known to those skilled in the art and is described, for example, in Ullmann's Encyclopedia of Industrial Chemistry, 6th Edition, 2000 Electronic Release.

The dividing wall (10) is held in place by struts which are welded to the cylindrical vessel.

The excellent operating time behavior of the recycle gas filter of the invention is made particularly clear by a polymerization plant comprising a gas-phase fluidized-bed reactor having a product output of about 250 000 metric tons per annum not requiring replacement of the filter elements over a period of about 2.5 years

The invention claimed is:

1. An apparatus for the polymerization of olefins comprising a gas-phase fluidized-bed reactor (1), a product offtake line (15) for taking polymer particles either continuously or discontinuously from the reactor (1), which line (15) is connected to a depressurization vessel (2) for separating polymer particles and gas, a recycle gas filter (3) for freeing the gas of entrained fine particles connected to the depressurization vessel (2), a compressor which compresses the gas which has been freed of fine particles and recirculates it into the reactor (1), with the recycle gas filter (3) having an inlet chamber (4) provided with a gas inlet (6), an outlet chamber (5) provided with a gas outlet (7), an essentially vertical sheet-like filter medium (9) for retaining the fine particles which separates the inlet chamber (4) from the outlet chamber (5) and a particle outlet (8), wherein the inlet chamber (4) has a dividing wall (10) which is arranged essentially parallel to the filter medium (9) and divides the inlet chamber (4) into an inflow region (4a), which is connected to the gas inlet (6), and a filter region (4b) in which the filter medium is located and has an upper opening and a lower opening which are dimensioned so that from 60 to 90% of the volume flow flows through the upper opening so that flow along the filter medium (9) from the top downward results.

2. The apparatus according to claim 1, wherein the upper opening and lower opening are dimensioned so that from 60 to 85% of the volume flow flows through the upper opening.

3. The apparatus according to claim 1, wherein the dividing wall (10) is cylindrical and the filter medium (9) is located in the interior of the cylindrical dividing wall (10).

4. The apparatus according to claim 1, wherein the inlet chamber (4) is cylindrical and the gas inlet (6) is connected eccentrically to the inlet chamber (4).

5. The apparatus according to claim 1 further comprising a throughput per unit area through the filter of from 20 to 100 $m^3/m^2h$.

6. The apparatus of claim 1 wherein ethylene is polymerized.

7. The apparatus of claim 2 wherein 65 to 80% of the volume flow flows through the upper opening.

8. The apparatus of claim 4 wherein the gas inlet (6) is connected essentially tangentially to the inlet chamber (4).

9. The apparatus of claim 5 wherein the throughput per unit area through the filter is 30 to 60 $m^3/m^2h$.

10. A process comprising polymerizing olefins in the presence of a catalyst in a gas-phase fluidized-bed reactor (1) comprising polymer particles and gas, wherein the polymer particles are taken off continuously or discontinuously from the reactor (1), the polymer particles are separated from the gas carried out together with them and the gas is freed of entrained fine particles by means of a recycle gas filter (3), compressed and at least partly recirculated to the reactor (1), with the recycle gas filter (3) having an inlet chamber (4) provided with a gas inlet (6), having an essentially vertical sheet-like filter medium (9) for retaining the fine particles, wherein from 60 to 90% of the volume flow flows onto the filter medium (9) from above, so that flow along the filter medium (9) from the top downward results.

11. The process according to claim 10, wherein flow into the inlet chamber (4) is essentially tangential.

12. The process according to claim 10, wherein the inlet chamber (4) has a dividing wall (10) which is arranged essentially parallel to the filter medium (9) and divides the inlet chamber (4) into an inflow region (4a), which is connected to the gas inlet (6), and a filter region (4b), in which the filter medium is located, and the dividing wall (10) has an upper opening and a lower opening in the form of annular gaps.

13. The process according to claim 10 further comprising a throughput per unit area through the filter of 30 to 60 $m^3/m^2h$.

14. The process according to claim 10 wherein ethylene is polymerized.

15. The process according to claim 12, further comprising a gap velocity of less than 1 m/s.

\* \* \* \* \*